United States Patent
Yamami et al.

[11] Patent Number: 6,047,693
[45] Date of Patent: Apr. 11, 2000

[54] DUST COLLECTOR-EQUIPPED POWER CUTTER

[75] Inventors: Hirofumi Yamami; Fujio Kobayashi; Giichi Iida, all of Tokyo, Japan

[73] Assignee: Kioritz Corporation, Tokyo, Japan

[21] Appl. No.: 09/096,050

[22] Filed: Jun. 11, 1998

[30] Foreign Application Priority Data

Jun. 30, 1997 [JP] Japan .................................. 9-174802

[51] Int. Cl.$^7$ .................................................. B28D 7/02
[52] U.S. Cl. .......................................... 125/13.01; 30/124
[58] Field of Search ................................ 83/100; 30/124; 125/13.01; 451/352, 358, 456; 301/122, 388, 390, 391

[56] References Cited

U.S. PATENT DOCUMENTS

| | | | |
|---|---|---|---|
| 1,000,719 | 8/1911 | Cram | 201/117 |
| 4,095,615 | 6/1978 | Ramsauer | 137/527.8 |
| 4,367,665 | 1/1983 | Terpstra at al. | 83/100 |
| 4,491,297 | 1/1985 | Maier et al. | |
| 5,074,044 | 12/1991 | Duncan et al. | 30/124 |
| 5,440,809 | 8/1995 | Padilla | 451/456 X |
| 5,819,619 | 10/1998 | Miller et al. | 83/100 |

FOREIGN PATENT DOCUMENTS 8116897  1/1982  Germany .

OTHER PUBLICATIONS

Abstract of Japanese No. 6–79520.

*Primary Examiner*—Rinaldi I. Rada
*Assistant Examiner*—Dominic J. Troiano
*Attorney, Agent, or Firm*—Baker & Botts, L.L.P.

[57] ABSTRACT

A dust collector-equipped power cutter, which is easy to handle in operation and convenient for storage and transportation thereof and is capable of preventing dusty air from flowing back to the cutter portion when a cutting operation is interrupted, includes a main body, a cutter, a dust-sucking fan, and a dust hose assembly. The dust hose assembly includes a first dust hose section and a second dust hose section and a hose connector joining the first hose section and the second hose section. Each of the hose sections has a spiral rib on an outer peripheral surface, and the hose connector has a spiral groove on an inner wall of each end portion, the dust hose section and the hose connector being adapted to be interconnected with each other through a threaded engagement between the spiral rib and the spiral groove. The hose connector is provided with a check valve to prevent back flow when a cutting operation is interrupted or terminated.

8 Claims, 3 Drawing Sheets

DUST COLLECTOR-EQUIPPED POWER CUTTER

BACKGROUND OF THE INVENTION

This invention relates to a dust collector-equipped power cutter and in particular to a portable type power cutter having a cutter disk that is driven by a prime mover, such as a small air-cooled two stroke internal combustion engine or an electric motor, a dust-sucking fan, and a dust hose for discharging the dust sucked by the fan.

A conventional portable type power working machine of this kind, which is provided with a dust collector, is generally comprised of a main body provided with a prime mover, a cutter disk rotated by the prime mover, a safety cover encasing part of the cutting edge portion and parts of both sides of the cutter disk so as to form a dust passage between the safety cover and the cutter disk, a dust-sucking fan attached to the safety cover for sucking dust generated when the cutter disk is cutting a workpiece and discharging the dust through a dust-discharge passageway, and a dust hose for transferring and discharging dust sucked by the dust-sucking fan. One example of such a power cutter is disclosed in Japanese Patent Publication H/7-14570.

In the use of such a conventional power cutter, the dust generated in the course of cutting, for example, a concrete product, is sucked through the dust discharge passage formed between the cutter disk and the safety cover by the sucking action of the dust-sucking fan, which is rotated by the prime mover, and then discharged from the dust-sucking fan through the dust hose in a rearward direction from the power cutter. In some cases, an air permeable dust bag, such as a cloth bag, is attached to the distal end of the dust hose so as to separate dust particles from the dusty air transferred under pressure through the dust hose, thus leaving the dust particles in the bag while discharging clear air free of dust from the bag.

However, the dust hose attached to the aforementioned dust collector-equipped power cutter is formed of a single continuous piece of hose, the proximal end of which is fastened to the dust-discharging portion of the dust-sucking fan, while the distal end extends rearwardly from the power cutter. Therefore, it is very troublesome to deal with this long dust hose, and at the same time, very inconvenient for the storage thereof in a warehouse or other place or for the transportation thereof.

Furthermore, in a cutting operation in an environment where the aforementioned dust bag is not required to be employed, it may be desirable to use a dust hose of a short length rather than the aforementioned long dust hose. In such a case, a short dust hose is separately prepared in advance and substituted for the long dust hose. However, this exchanging operation is very troublesome in the conventional power cutter.

Furthermore, the dusty air containing dust particles which has been introduced into the dust bag is then separated, leaving the dust particles in the dust bag, and allowing only dust-free air to be discharged from the dust bag. However, when the cutting operation is interrupted or terminated, the power transmission to the dust-sucking fan is cut off, which stops the rotation of the dust-sucking fan, thus resulting in the stoppage of air flow toward the dust bag. At this moment when the air flow toward the dust bag is interrupted, the interior of the dust bag is still kept in a high pressure condition due to the air flow that has been introduced in the dust bag before the cut-off of the dust-sucking fan. Therefore, due to this high pressure inside the dust bag, the dusty air containing dust particles and existing in the dust bag flows backward, i.e., toward the dust-sucking fan, and is discharged outside through the safety cover, thus annoying the operator.

The same problem of back-flow of dusty air occurs when the operator steps on the dust bag accidentally.

BRIEF SUMMARY OF THE INVENTION

This invention has been made to solve the aforementioned problems, and therefore an object of the present invention is to provide a dust collector-equipped power cutter, which is easy to handle when operated, convenient to store and transport, and at the same time, capable of preventing dusty air from flowing back to the cutter portion at the moment when a cutting operation is interrupted or terminated, thus preventing environmental pollution.

With a view to realizing the aforementioned object, this invention provides a dust collector-epuipped power cutter which essentially comprises a main body, a cutter, a dust-sucking fan, and a dust hose assembly. The dust hose assembly has a first dust hose section and a second dust hose section and a hose connector joining the first hose section and the second hose section. Each of the hose sections, in a preferred arrangement, has a spiral rib on an outer peripheral surface, and the hose connector has a spiral groove on an inner wall of each end portion, whereby the dust hose sections and the hose connector are adapted to be interconnected with each other through a threaded engagement between the spiral rib and the spiral groove. It is also preferred that the hose connector be secured at a rearward side wall of the main body by means of a hose fixture.

In a preferred embodiment of the dust collector-equipped power cutter according to this invention, the hose fixture comprises a mounting plate for mounting the hose fixture on the main body and a C-shaped spring wire hooked to the mounting plate. The hose connector is adapted to be clamped between the spring wire and the mounting plate.

In another embodiment of the dust collector-equipped power cutter according to this invention, the hose connector is provided on the inside thereof with a check valve. In a specific embodiment of the check valve, a cylindrical main body is provided with an annular flange extending inwardly, and an elastic disk valve which is adapted to be contacted with a downstream side of the annular flange. The cylindrical main body is provided at a portion close to the annular flange with a valve-mounting slit, and the valve is provided with a lug which is adapted to be inserted into the valve-mounting slit and fixed therein by means of adhesive, or in some other suitable way.

Since the dust hose has two parts and is adapted to be engaged and interconnected with the hose connector according to the dust collector-equipped power cutter of this invention as explained above, the section of the dust hose assembly which is disposed at the downstream side of the hose connector can be easily detached from the power cutter by simply rotating it relative to the hose connector. Therefore, since the section of the dust hose assembly downstream from the connector and the dust bag are made separable from the power cutter, the power cutter as well as the dust hose can be handled in a compact form, so that the handling and maintenance of the power cutter at the occasion of storing it in a warehouse or other location or transporting it can be facilitated.

Furthermore, since the downstream dust hose section is removably attached to the hose connector, the power cutter may be operated without attaching the downstream section to the hose connector if the cutting operation of the power cutter is to be performed in an environment where the dust bag is not required to be employed and a long hose is not wanted.

Furthermore, since the hose connector is clamped to the power cutter by means of a hose fixture, the hose connector can be easily separated from the power cutter and at the same time, can be easily secured onto any desired side at the rearward portion of the main body of the power cutter. Accordingly, the hose connector can be optionally disposed at either side of the rear portion of the main body of the power cutter which is opposite to the side where the operator using the power cutter stands. As a result, the presence of the hose connector would not become an obstacle for the operator of the power cutter and at the same time, the operator can be prevented from being showered with dusty air discharged from the hose connector, thus making it possible for the operator to work in an environmentally favorable condition.

Additionally, since a check valve is disposed in the hose connector, it is now possible to prevent dusty air from being discharged from the cutter portion due to a back flow of dusty air at the moment when the rotations of the cutter and the dust-sucking fan are stopped. Moreover, since the check valve in the hose connector is provided with a cylindrical main body and with a valve having a lug, and since the lug is inserted into the valve-mounting slit and fixed therein by means of adhesive, or in any suitable manner, the check valve can be easily assembled, and at the same time, the check valve can be easily mounted inside the hose connector.

DETAILED DESCRIPTION OF THE INVENTION

One embodiment of a dust collector-equipped power cutter according to the present invention will be explained in detail below with reference to the drawings.

Figure 1:
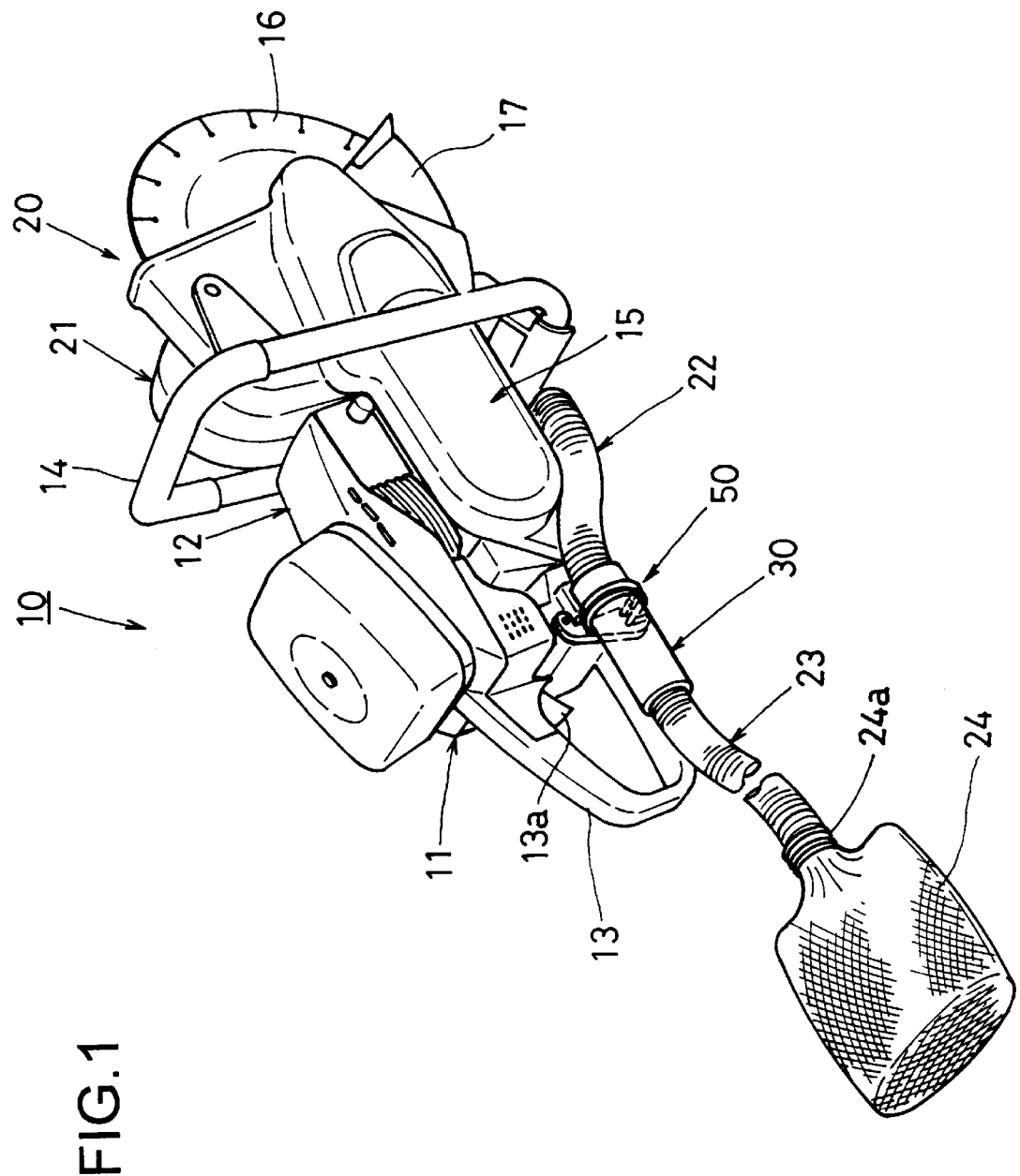
FIG. 1 is a perspective view, generally illustrating a dust collector-equipped power cutter according to one embodiment of the present invention.

FIG. 1 shows a perspective view, illustrating an entire structure of a dust collector-equipped power cutter or so-called engine cutter according to this embodiment.

The engine cutter 10 shown in FIG. 1 comprises a main body 12 having a central portion, on which a small air-cooled two-stroke gasoline internal combustion engine (hereinafter referred to as an internal combustion engine) 11 is mounted as a prime mover. A rear handle 13 provided with a throttle trigger 13a, and extending in the longitudinal direction of the engine cutter 10, is attached to the rear side of the main body 12. Furthermore, a U-shaped front handle 14 is attached to the main body 12 and extends upwardly from opposite lower sides of the central portion of the main body 12 so as to extend over the upper front portion of the main body 12.

To the main body 12 are further attached a cutter disk 16 that is rotated by the internal combustion engine 11 through a belt-driven transmission device (not shown) installed in a transmission case 15, and a working portion 20 provided with a safety cover 17 that encases part of the cutting edge portion and parts of both sides of the cutter disk 16 so as to form a dust passage between the safety cover 17 and the cutter disk 16. A centrifugal fan 21 for sucking dust is attached to one side wall of the safety cover 17 and is driven by the internal combustion engine 11 through the belt-driven transmission device (not shown).

To the dust-discharging portion (not shown) of the centrifugal fan 21 is fixed the proximal end of a flexible first dust hose section 22. The distal end portion of the first dust hose section 22 passes under the main body 12 to the side wall of the main body 12 that is opposite to the side wall where the centrifugal fan 21 is located and leads to the rear portion of the main body 12, which is fitted with a rigid hose connector 30 that receives the distal end of the first dust hose section 22. The hose connector 30 is fixed to the main body 12 by means of a hose fixture 50.

The proximal end portion of a flexible second dust hose section 23 is also fitted in the hose connector 30 so as to be removably fixed thereto. The distal end portion of the second dust hose section 23 extends rearwardly from the engine cutter 10 and is connected, such as by a rotatable universal joint 24a of the one-touch type, to a dust bag 24 made of an air permeable cloth or the like.

The first and second dust hose sections 22 and 23 are made of a flexible material, such as a synthetic resin, so as to be elastically deformable and freely bent, and are provided on the outer peripheral surfaces along the full lengths thereof, including their end portions, with a spiral rib 34 having a rectangular cross-section.

Figure 2:
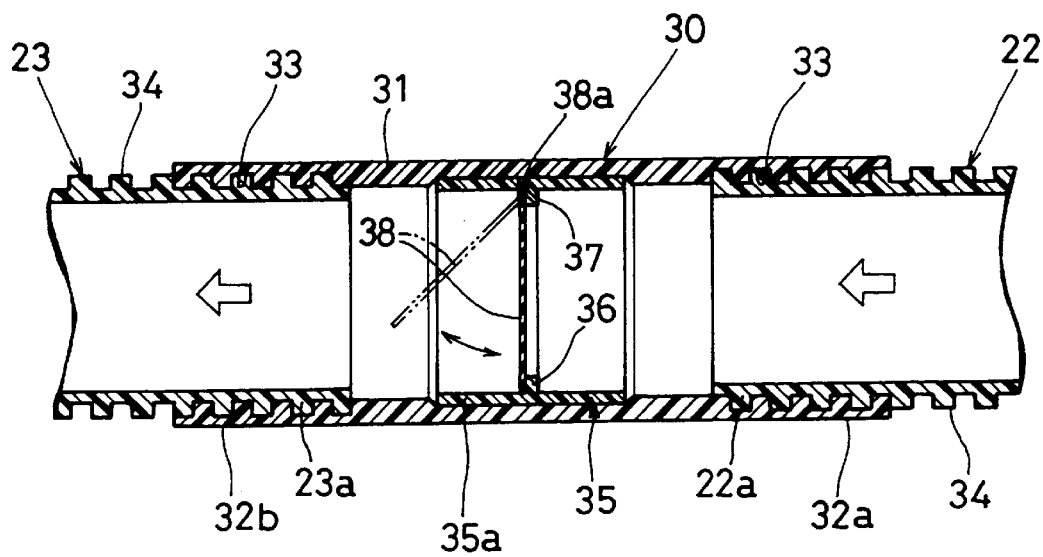
FIG. 2 is a longitudinal sectional view of the connecting portion between the dust hose and the hose connector shown in FIG. 1.
Figure 3:
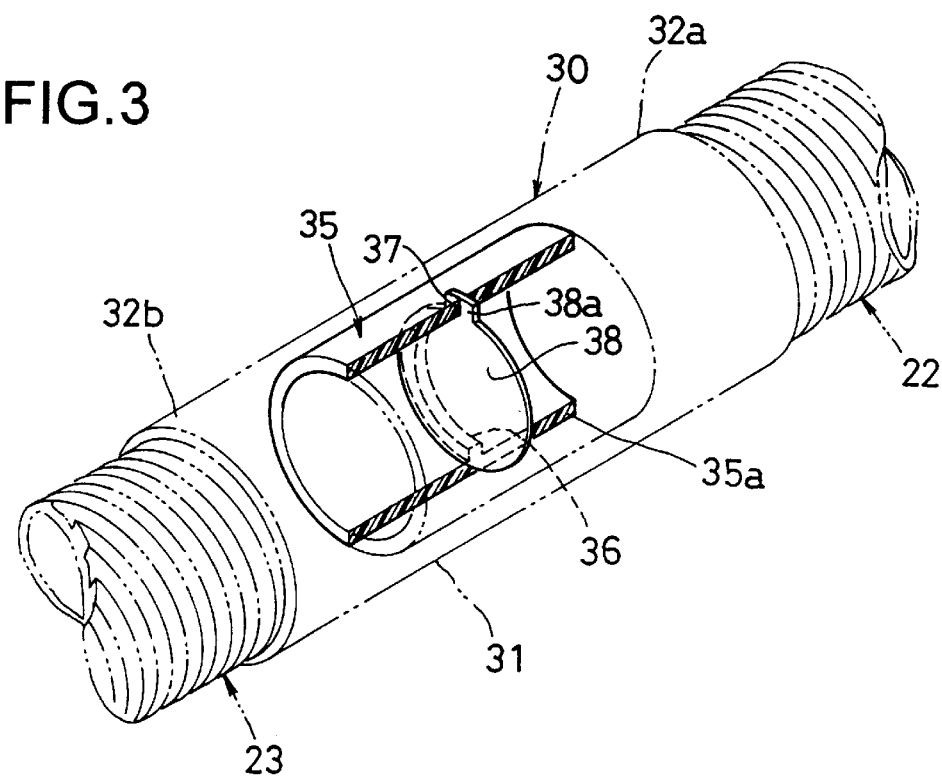
FIG. 3 is a partially sectioned perspective view of a check valve disposed in the hose connector shown in FIG. 2.

FIGS. 2 and 3 show the details of the hose connector 30. The hose connector 30 has a cylindrical portion 31, both ends of which are constituted by tubular openings 32a and 32b, each of which has on the inner surface thereof a spiral groove 33 having a rectangular cross-section which is adapted to accept the spiral rib 34 formed respectively on the distal tip end portion 22a of the first dust hose section 22 and on the proximal end portion 23a of the second dust hose section 23.

The hose connector 30 is also provided with an internally located check valve 35, which is disposed at a middle portion of the hose connector 30. The check valve 35 comprises a cylindrical main body 35a, an annular flange 36 extending inwardly from the inner wall of the cylindrical main body 35a, and a valve-mounting slit 37 having a rectangular cross-section and passing through a wall portion of the cylindrical main body 35a, which is located close to the downstream side of the annular flange 36.

An elastic disk valve 38 made of a synthetic rubber, or some other elastic material, and having an outer diameter slightly smaller than the inner diameter of the cylindrical main body 35a is disposed on the side of the annular flange 36 facing the distal tubular opening 32b, to which the second dust hose section 23 is connected, thus enabling the disk valve 38 to form a seal with the downstream side face of the annular flange 36. The elastic disk valve 38 is also provided with a lug 38a extending from the outer periphery of the disk valve 38, the lug 38a being adapted to be inserted into the valve-mounting slit 37 formed in the cylindrical main body 35a and fixed therein by means of adhesive or in any suitable manner.

The hose connector 30 can be assembled by the following procedures. The cylindrical main body 35a provided with the annular flange 36 and the valve-mounting slit 37 is prepared in advance. The disk valve 38 provided with the lug 38a is also prepared in advance. Then, the lug 38a of the disk valve 38 is introduced into the valve-mounting slit 37 of the cylindrical main body 35a and secured thereto, such as by an adhesive, thus assembling the check valve 35. Thereafter, by means of insert molding from a synthetic resin having a suitable rigidity, the cylindrical portion 31 can be formed on the outer peripheral wall of the check valve 35, thus completing the hose connector 30.

The check valve 35 disposed inside the hose connector 30 functions such that the valve 38 is opened by bending as shown by the phantom line in FIG. 2 when it is pushed by an air flow from the centrifugal fan 21, but the valve 38 is forced to seal in contact with the downstream side face of the annular flange 36 as shown by the solid line in FIG. 2 when it is pushed by an air flow coming from the dust bag 24, thereby closing the passage.

Figure 4:
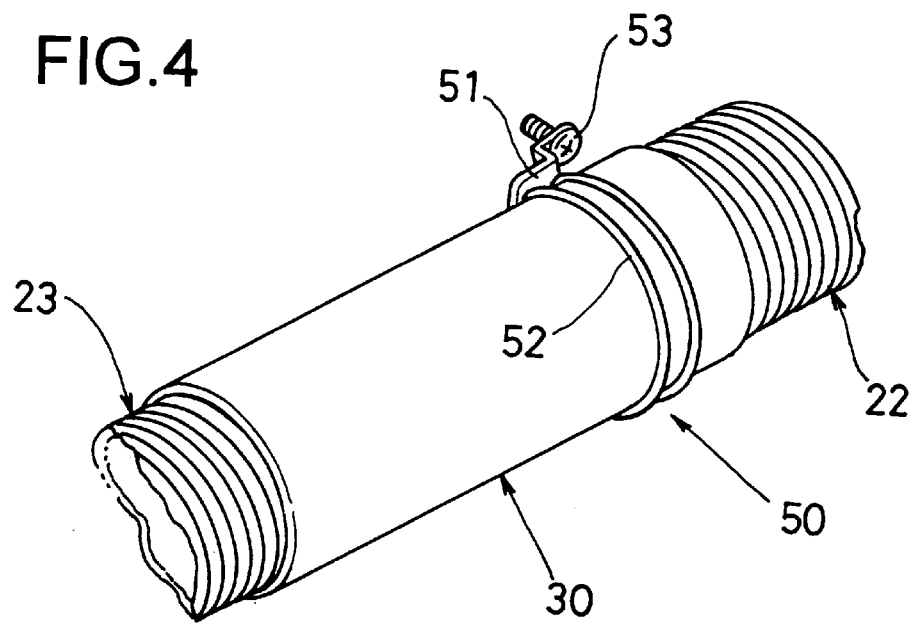
FIG. 4 is a perspective view illustrating a state where the hose connector shown in FIG. 2 is attached to a power cutter by means of a hose fixture.
Figure 5:
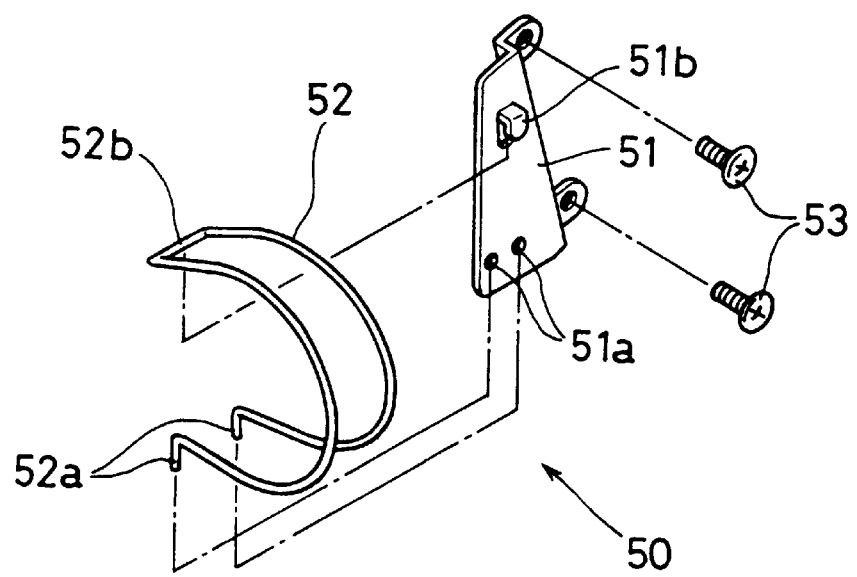
FIG. 5 is an exploded perspective view of the hose fixture shown in FIG. 4.

FIG. 4 illustrates in detail the manner by which the hose connector 30 is attached to the main body 12. The hose connector 30 is secured to the main body 12 by means of a hose fixture 50. As shown in FIG. 5, the hose fixture 50 is composed of a mounting plate 51 and a C-shaped spring wire 52. The mounting plate 51 is fixed to one side of the rear portion of the main body 12 by means of a pair of small screws 53. A pair of lower bent portions 52a of the spring wire 52 are inserted into a pair of lower holes 51a formed in the mounting plate 51. Then, while pressing the spring wire 52 downward, the upper bent portion 52b thereof is hooked to a down-bent hook 51b formed at an upper portion of the mounting plate 51. As a result, the hose connector 30 can be elastically clamped between the spring wire 52 and the mounting plate 51 as shown in FIG. 4.

The operation of the dust collector-equipped power cutter 10 according to this embodiment is explained below.

The internal combustion engine 11 is started, and then the front handle 14 is gripped with the left hand, while the rear handle 13 is gripped with the right hand, and the power cutter is lifted up. Then, the throttle trigger 13a is squeezed to increase the output of the internal combustion engine 11 so as to transmit the power from the internal combustion engine 11, through a centrifugal clutch (not shown) and a belt-driven transmission device (not shown), to the cutter 16, thus causing the cutter 16 to rotate.

The cutting edge of the cutter 16 is then contacted with a workpiece, such as a concrete workpiece, to be cut. The dust generated in the cutting operation is sucked along with air into the dust passage formed between the cutter 16 and the safety cover 17 by the sucking action of the dust-sucking fan 21, which is driven by the internal combustion engine 11. The dusty air drawn into the fan 21 is then transferred under pressure from the interior of the fan 21 to the first dust hose section 22, which constitutes a dust-transferring pipe, from which the dusty air is transferred under pressure through the hose connector 30 and the second dust hose section 23 into the dust bag 24.

The valve 38 of the check valve 35 disposed in the hose connector 30 is opened by the pressurized dusty air which is transferred through the first dust hose section 22 from the dust-sucking fan 21, thus allowing the dusty air to be transferred through the second dust hose section 23 into the dust bag 24. The air containing dust particles which is introduced into the dust bag 24 is discharged out of the gas-permeable dust bag 24, while the dust particles is captured and collected in the dust bag 24.

When the cutting operation is to be interrupted or terminated, the user releases its finger from the throttle trigger 13a so as to lower the output of the internal combustion engine 11. As a result, the power transmission from the internal combustion engine 11 to the cutter 16 as well as to the dust-sucking fan 21 is cut off, thereby stopping the rotation of the cutter 16 as well as of the dust-sucking fan 21. When the rotation of the dust-sucking fan 21 is stopped, the air flowing toward the dust bag 24 is also stopped. At the moment when the air flow is stopped in this manner, the interior of the dust bag 24 is still in a high pressure condition due to the air flow that had been introduced in the dust bag 24 before the cut-off of the dust-sucking fan 21. Therefore, due to the high pressure inside the dust bag 24, the dusty air contained in the dust bag 24 tends to flow backward, i.e., toward the dust-sucking fan 21.

However, since there is a check valve 35 in the hose connector 30, the valve 38 of the check valve 35 is caused to move into sealing engagement with the side wall of the annular flange 36 due to the pressure of the back flow of the air from the dust bag 24, thus closing the passageway and preventing the dusty air from flowing back to the dust-sucking fan 21. Accordingly, the discharge of dusty air from the portion of the safety cover 17 due to the back flow of the dusty air at the moment of stopping the rotation of the cutter 16 and the dust-sucking fan 21 can be prevented.

Since the hose connector 30 is connected with the second dust hose section 23 by a screw arrangement, the second hose section 23 can be easily separated from the hose connector 30 by simply rotating it relative to the hose connector 30. Therefore, since the second dust hose section 23 is made separable from, the power cutter 10, the second dust hose section 23 and the dust bag 24 can be stored or transported in a compact form separately from the power cutter 10 so that the handling and maintenance of the power cutter at the occasion of storing it in a warehouse or transporting it can be facilitated.

Further, since the second dust hose section 23 is removably attached to the hose connector 30, a cutting operation employing the power cutter 10 can be easily performed by dismounting the second dust hose section 23 from the hose connector 30 if the cutting operation is to be performed in an environment where the dust bag 24 does not have to be used.

Furthermore, since the hose connector 30 according to this embodiment is clamped to the power cutter 10 by means of the C-shaped spring wire 52 of the hose fixture 50, and at the same time, since the hose fixture 50 is fixed to the power cutter 10 by means of fixing screws 53, the hose connector 30 can be easily separated from the hose fixture 50 and at the same time, the hose fixture 50 itself can be easily dismounted from the power cutter 10 by simply removing the fixing screws 53. The hose fixture 50 can be easily secured onto either side at the rearward portion of the main body 12 of the power cutter 10 as desired, the main body 12 being provided with screw holes on both sides for the fixture 50. Accordingly, the hose connector 30 can be optionally disposed at either side of the rear portion of the main body 12 of the power cutter 10 which is opposite to the side where the operator manipulating the power cutter 10 stands. As a result, the presence of the hose connector 30 would not become an obstacle for the operator during the cutting operation and at the same time, the operator can be prevented from being showered with dusty air discharged from the hose connector 30, thus making it possible for the operator to continue the cutting operation in an environmentally desirable situation.

Additionally, since a check valve 35 disposed in the hose connector 30 according to this embodiment is provided with the cylindrical main body 35a and the valve 38, and at the same time, since the valve 38 is provided with the lug 38a which is adapted to be inserted into the valve-mounting slit 37 of the cylindrical main body 35a and fixed therein by means of adhesive, or in some other suitable way, the check valve 35 can be easily assembled, and at the same time, the check valve 35 can be easily mounted in the hose connector 30.

In the foregoing explanation, the present invention has been explained with reference to one embodiment. However, the present invention should not be construed to be limited by this embodiment, but may be variously modified within the spirit of this invention as claimed in the appended claims.

As seen from the above explanations, since the dust hose is composed of two sections that are adapted to be interconnected with each other via a hose connector, and at the same time, since the hose connector is clamped at the side wall of the rear portion of the main body by means of a hose fixture according to the dust collector-equipped power cutter of this invention, the power cutter is easy to handle in operation and convenient to store and transport. At the same time, it is now possible to prevent dusty air from flowing back to the cutter portion at the moment when the cutting operation is interrupted or terminated.

What is claimed is:

1. A dust collector-equipped power cutter comprising a main body, a cutter, a dust-sucking fan, and a dust hose assembly, the dust hose assembly having a first dust hose section having a proximal end connected to the dust-sucking fan and a distal end and a second dust hose section having a proximal end and a distal end, and a hose connector secured at a rearward sidewall of the main body by means of a hose fixture and joining the distal end of the first hose section and the proximal end of the second hose section, whereby the first hose section and the second hose section are connected in series for flow of dust from the dust-sucking fan to the distal end of the second hose section in operation of the dust-sucking fan.

2. The dust collector-equipped power cutter according to claim 1, wherein each of the hose sections has a spiral rib on an outer peripheral surface, and the hose connector has a spiral groove on an inner wall of each end portion, the dust hose section, and the hose connector being adapted to be interconnected with each other through a threaded engagement between the spiral rib and the spiral groove.

3. The dust collector-equipped power cutter according to claim 1, wherein said hose fixture includes a mounting plate attached to the main body and a C-shaped spring wire arranged to be hooked to the mounting plate, and wherein the hose connector is adapted to be clamped between the spring wire and the mounting plate.

4. The dust collector-equipped power cutter according to claim 2, wherein said hose fixture includes a mounting plate attached to the main body and a C-shaped spring wire arranged to be hooked to the mounting plate, and wherein the hose connector is adapted to be clamped between the spring wire and the mounting plate.

5. The dust collector-equipped power cutter according to claim 1, wherein said hose connector is provided with a check valve.

6. The dust collector-equipped power cutter according to claim 2, wherein said hose connector is provided with a check valve.

7. The dust collector-equipped power cutter according to claim 5, wherein said check valve includes a cylindrical main body provided with an annular flange extending inwardly and an elastic disk valve which is adapted to engage in sealing relation a downstream side of the annular flange, the cylindrical main body is provided at a portion close to the annular flange with a valve-mounting slit, and the disk valve is provided with a lug which is adapted to be inserted into the valve-mounting slit and fixed therein.

8. The dust collector-equipped power cutter according to claim 6, wherein said check valve includes a cylindrical main body provided with an annular flange extending inwardly and an elastic disk valve which is adapted to engage in sealing relation a downstream side of the annular flange, the cylindrical main body is provided at a portion close to the annular flange with a valve-mounting slit, and the disk valve is provided with a lug which is adapted to be inserted into the valve-mounting slit and fixed therein.

* * * * *